(12) United States Patent
Miyata

(10) Patent No.: US 8,860,733 B2
(45) Date of Patent: Oct. 14, 2014

(54) DEVICE FOR DISPLAYING CUTTING SIMULATION, METHOD FOR DISPLAYING CUTTING SIMULATION, AND PROGRAM FOR DISPLAYING CUTTING SIMULATION

(75) Inventor: Akira Miyata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 240 days.

(21) Appl. No.: 12/995,071

(22) PCT Filed: May 25, 2009

(86) PCT No.: PCT/JP2009/059547
§ 371 (c)(1),
(2), (4) Date: Nov. 29, 2010

(87) PCT Pub. No.: WO2009/145155
PCT Pub. Date: Dec. 3, 2009

(65) Prior Publication Data
US 2011/0080412 A1      Apr. 7, 2011

(30) Foreign Application Priority Data

May 29, 2008   (JP) ................................. 2008-141471

(51) Int. Cl.
*G06T 15/40*   (2011.01)
*G05B 19/4069*   (2006.01)
*G06T 15/08*   (2011.01)
*G06T 15/06*   (2011.01)
*G06T 19/20*   (2011.01)

(52) U.S. Cl.
CPC .. *G05B 19/4069* (2013.01); *G05B 2219/35335* (2013.01); *G06T 2219/2021* (2013.01); *G06T 15/08* (2013.01); *G05B 2219/35145* (2013.01); *G05B 2219/37074* (2013.01); *G06T 15/06* (2013.01); *G06T 19/20* (2013.01); *G05B 2219/35318* (2013.01); *G05B 2219/45044* (2013.01)
USPC ........... 345/473; 345/419; 345/423; 345/424; 345/427

(58) Field of Classification Search
USPC .................................. 345/473, 424, 422, 430
See application file for complete search history.

(56) References Cited

U.S. PATENT DOCUMENTS 6,396,492 B1    5/2002   Frisken et al.
2005/0264255 A1   12/2005   Maruyama et al.
(Continued)

FOREIGN PATENT DOCUMENTS

JP    2 236676    9/1990
JP    5-19837     1/1993
(Continued)

OTHER PUBLICATIONS

Takata, S., et al. "A cutting simulation system for machinability evaluation using a workpiece model." CIRP Annals-Manufacturing Technology 38.1 (1989): 417-420.*
(Continued)

*Primary Examiner* — Kimbinh T Nguyen
*Assistant Examiner* — Whitney Pointe
(74) *Attorney, Agent, or Firm* — Oblon, Spivak, McClelland, Maier & Neustadt, L.L.P.

(57) ABSTRACT

In order to reduce the amount of computation required for ray tracing and facilitate simulating of changes in workpiece shape even on an inexpensive, low-performance computer, a device for displaying a cutting simulation includes: a rendered workpiece image update section for updating by ray tracing a portion of a rendered workpiece image buffer and a rendered workpiece depth buffer, the portion being associated with a rendering region corresponding to a change in the shape of the workpiece; a rendered tool image creation section for rendering a tool image by ray tracing for the current tool rendering region; and an image transfer section for transferring a partial image of the previous tool rendering region and the current workpiece rendering region to be updated from the rendered workpiece image buffer to a display frame buffer as well as transferring the current tool rendering image to the display frame buffer.

6 Claims, 6 Drawing Sheets

(56) References Cited

U.S. PATENT DOCUMENTS

| | | | |
|---|---|---|---|
| 2007/0206008 A1* | 9/2007 | Kaufman et al. | 345/424 |
| 2008/0075346 A1 | 3/2008 | Matsumoto | |
| 2010/0237821 A1 | 9/2010 | Kitanaka | |

FOREIGN PATENT DOCUMENTS

| | | | | |
|---|---|---|---|---|
| JP | 2 532055 | | 7/1996 | |
| JP | 2 666353 | | 7/1997 | |
| JP | 2001-356804 | | 12/2001 | |
| JP | 3 571564 | | 7/2004 | |
| JP | 2005-341669 | | 12/2005 | |
| JP | 4065901 | B1 | 1/2008 | |
| JP | 2008 83973 | | 4/2008 | |
| JP | 2008287456 | A * | 11/2008 | |
| JP | 2009-290957 | | 12/2009 | |

OTHER PUBLICATIONS

International Search Report issued Jul. 28, 2009 in PCT/JP09/059547 filed May 25, 2009.

Decision of a Patent Grant issued Dec. 13, 2011 in Japanese Patent Application No. 2011-544745 (with English translation).

Decision of a Patent Grant issued Apr. 24, 2012, in Japanese Patent Application No. 2010-514470 (with English-language translation).

* cited by examiner

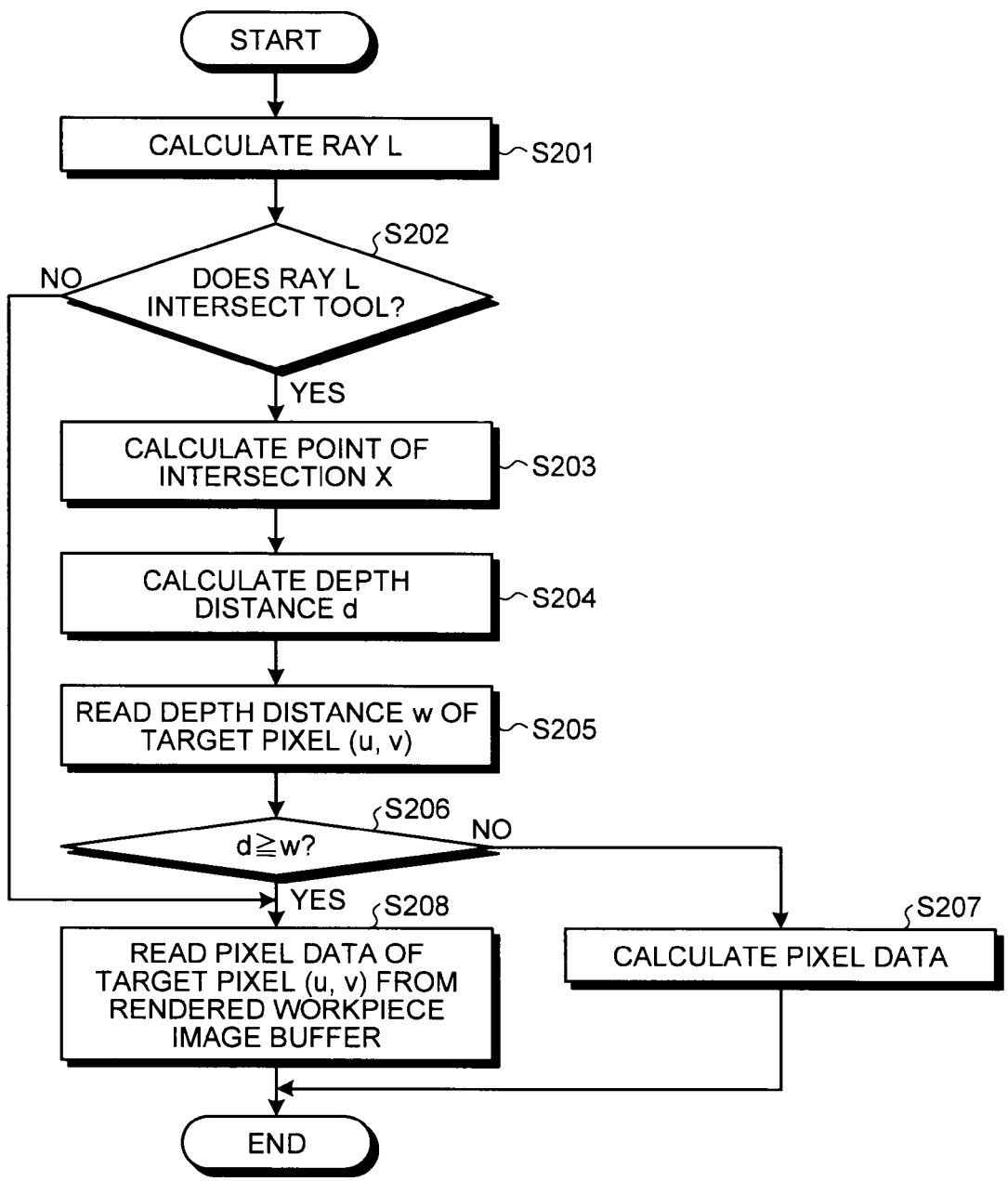

DEVICE FOR DISPLAYING CUTTING SIMULATION, METHOD FOR DISPLAYING CUTTING SIMULATION, AND PROGRAM FOR DISPLAYING CUTTING SIMULATION

TECHNICAL FIELD

The present invention relates to a device for displaying a cutting simulation, a method for displaying a cutting simulation, and a program for displaying a cutting simulation. In the cutting simulation, consecutive changes in the shape of a workpiece being cut are simulated on a computer and displayed on the screen of the display device in conjunction with the shape of a tool being used at that time.

BACKGROUND ART

In cutting a workpiece on a machine tool such as a machining center, a cutting simulation performed to simulate changes in the shape of the workpiece on a computer is required to efficiently process the changes in the shape of the workpiece and display consecutive changes in the shape of the workpiece at high speeds on a screen. In general, the cut surface created by cutting operations may have a complicated shape that is defined by the relative motion between the cutting tool and the workpiece. Therefore, the workpiece shape is often represented, for example, in a voxel model or a dexel model that employs a set of so-called cells or minute cubes or prisms.

By way of example, a method for performing high-speed simulations using the voxel or dexel model is disclosed in Patent Document 1. The method uses the shape data that is obtained by converting the three-dimensional workpiece model into a dexel model. Then, the method calculates a sweep shape formed when the tool moves along a travel path and calculates the wedged and cylindrical shapes that constitute the sweep shape. Then, the respective bottom surfaces are turned into a polygon to remove a hidden surface using three-dimensional graphics hardware capable of depth buffering, thereby creating an intermediate image. At this time, the upper edge of a dexel is cut off on the basis of a depth value stored in the depth buffer. The upper end portion of the dexel is then turned into a polygon, whose hidden surface is in turn eliminated using the three-dimensional graphics hardware, thereby creating a final image for display on a screen.

PRIOR ART DOCUMENTS

Patent Documents

Patent Document 1: Japanese Patent No. 3571564

DISCLOSURE OF INVENTION

Problem to be Solved by the Invention

In general, such a method as found in the conventional technology mentioned above is referred to as a polygon rendering scheme in which a displayed object is turned into a polygon to obtain an image with its hidden surface removed with the help of depth buffering. The polygon rendering scheme will take a long time to render polygons that are equivalent in number to the cells forming the voxel or dexel model employed for shape representations, though use of these models allow data structures to be simplified and internal shape processing to be performed more effectively. Accordingly, such a polygon rendering scheme is often based on the use of three-dimensional graphics hardware as in the aforementioned conventional art. However, such high-end three-dimensional graphics hardware may not be used in many cases by comparatively inexpensive computers often found at the place of machining operations.

On the other hand, the polygon rendering scheme described above can be replaced with another rendering scheme, i.e., the ray-tracing method. As shown in FIG. 2-1, in the ray-tracing method, a ray 203 is projected from each pixel 202 on the projection plane 201 in the direction of line of sight. Then, at the intersection 205 of the ray 203 and the object surface, color information (pixel values such as RGB) is obtained by calculation, thereby providing a display image. To use the ray-tracing method for displaying a voxel model 204, cells 206 found on the way to the object surface have to be sequentially traced as shown in FIG. 2-2, thereby determining whether the ray 203 intersects the cells. The determinations of the presence of intersections can be made relatively simply, but result in a considerable amount of computation as a whole because a large number of cells exist and the ray-tracing is repeated for each and every pixel.

As such, the ray-tracing method can be employed to simulate and display on a screen the shape of a workpiece, which is represented in the voxel model during its cutting operation. In this case, a considerable amount of computation required for ray tracing makes it difficult to perform these operations on an inexpensive, low-performance computer that has no three-dimensional graphics hardware.

The present invention was developed in view of the aforementioned problems. It is an object of the present invention to provide a device for displaying a cutting simulation, a method for displaying a cutting simulation, and a program for displaying a cutting simulation, which can reduce the amount of computation required for ray-tracing and allow changes in the shape of a workpiece to be easily simulated even on an inexpensive, low-performance computer with no three-dimensional graphics hardware.

Means for Solving Problem

In order to solve above-mentioned problems and to achieve the object, a device for displaying a cutting simulation according to the present invention represents a shape of a workpiece in a voxel model to simulate a change in the shape of the workpiece by a cutting operation. The device comprising: a rendered workpiece image update section for managing a rendered workpiece image buffer and a rendered workpiece depth buffer to hold image data and depth distance data of a projected image of the workpiece and updating by ray tracing a portion in the rendered workpiece image buffer and the rendered workpiece depth buffer, the portion being associated with a rendering region corresponding to a change in the shape of the workpiece; a rendered tool image creation section for creating a rendered tool image by ray tracing for a current tool rendering region with reference to the rendered workpiece image buffer and the rendered workpiece depth buffer updated by the rendered workpiece image update section; and an image transfer section for transferring a partial image of the previous tool rendering region and the current workpiece rendering region to be updated from the rendered workpiece image buffer to a display frame buffer as well as transferring a current rendered tool image to the display frame buffer.

The rendered workpiece image update section according to the present invention starts ray tracing at a location defined by a non-updated previous depth distance and coordinates of a ray-traced pixel.

According to the invention, the refreshing of a region, in which the tool was previously rendered, and the display updating of the workpiece with an actual change in the shape are separated from the display updating of a portion in which the tool is currently rendered. This minimizes the region that requires image rendering by ray-tracing. Furthermore, attention is also focused on the fact that a new surface created by cutting is always located at a deeper position than the previously viewed surface before cutting. This fact is reflected on the use of ray tracing to update a rendered image buffer portion and a depth buffer portion, which correspond to a rendered region associated with a change in the shape of the workpiece. Accordingly, the ray tracing is started from the location that is determined by the previous non-updated depth distance and the coordinates of a ray-traced pixel.

Effect of the Invention

According to the invention, the step of creating an image to be displayed on a screen is divided into two sub-steps of ray-tracing of a workpiece and ray-tracing of a tool. This allows for ray tracing of only the region that has to be truly updated, thereby reducing the amount of computation. Furthermore, the number of times of ray tracing of pixels which have to be updated from the previously displayed status is reduced, resulting in the total amount of computation being decreased. This allows cutting simulations to be performed even on an inexpensive low-performance computer.

Furthermore, in ray-tracing of pixels to be updated, the ray tracing starts at a location that is defined by a non-updated previous depth distance and coordinates of a ray-traced pixel. This allows for eliminating an unnecessary determination of the presence of an intersection between cell and ray. Thus, the number of determinations of cell intersections is reduced and the amount of computation per tracing for one update is decreased. It is thus possible to perform a cutting simulation even on an inexpensive low-performance computer.

BRIEF DESCRIPTION OF DRAWINGS

FIG. 2-1 is an explanatory view showing a method for displaying a voxel model by ray tracing, in which a ray is projected in the direction of line of sight from each pixel on a projection plane to calculate color information at an intersection of the ray and the object surface and thereby obtains a display image.

FIG. 2-2 is an explanatory view showing a method for displaying a voxel model by ray tracing, in which cells found on the way until the ray reaches an object surface are traced sequentially to determine whether there is an intersection of the ray and the cells.

FIG. 4-1 is an explanatory view illustrating the basic principle of ray tracing in a rendered workpiece image update section, showing the result of ray tracing for a previous screen display update.

FIG. 4-2 is an explanatory view illustrating the basic principle of ray tracing in the rendered workpiece image update section, showing the ray tracing for a current screen display update.

FIG. 6 is a flowchart illustrating the flow of ray tracing in a rendered tool image creation section.

BEST MODES FOR CARRYING OUT THE INVENTION

Now, embodiments of a device for displaying a cutting simulation, a method for displaying a cutting simulation, and a program for displaying a cutting simulation according to the present invention will be described in detail below with reference to the accompanying drawings. Note that the invention is not limited to these embodiments.

Embodiments

Figure 1:
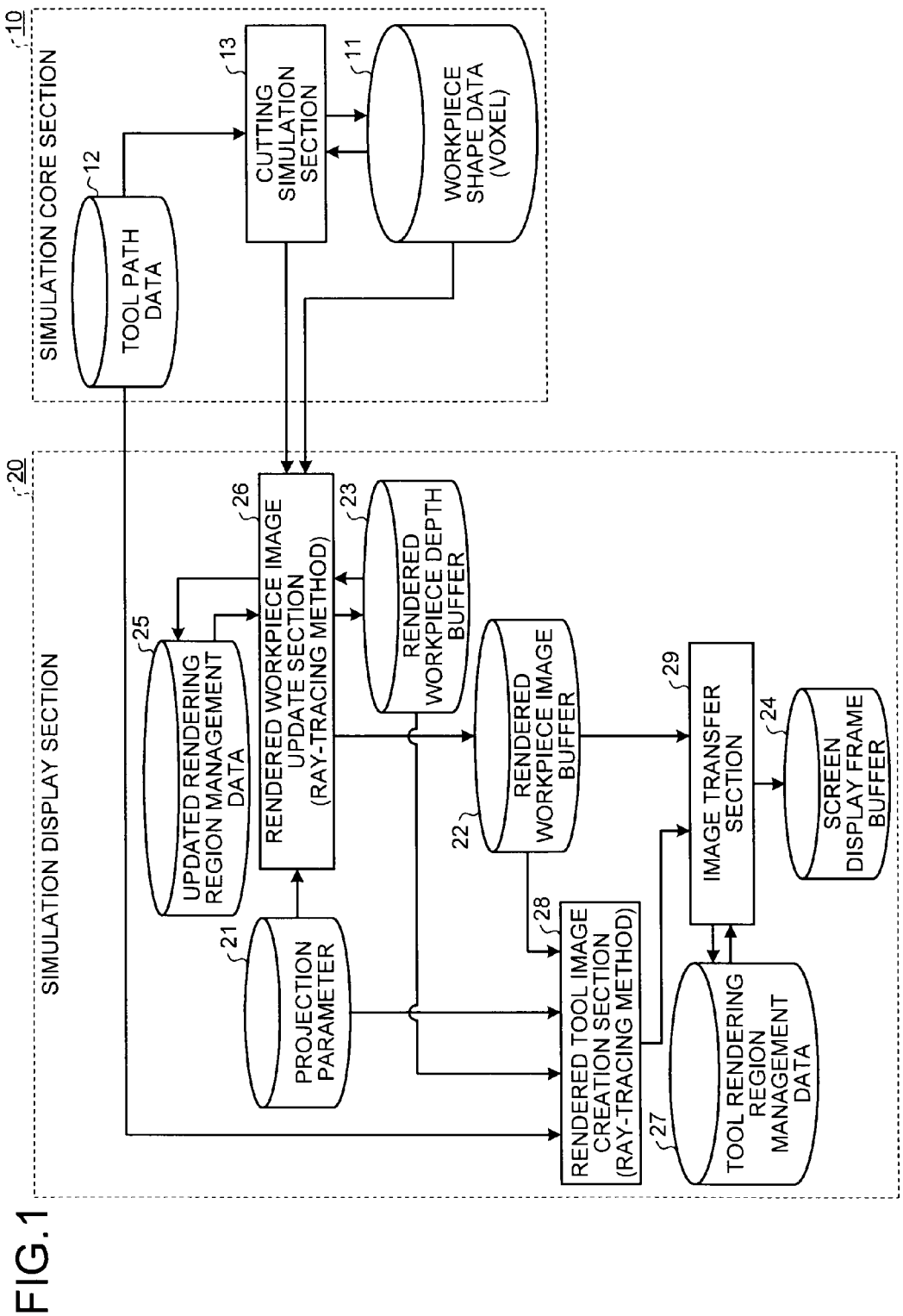
FIG. 1 is a block diagram illustrating the entire configuration of an embodiment of a device for displaying a cutting simulation according to the present invention.

FIG. 1 is a block diagram illustrating the entire configuration of an embodiment of a device for displaying a cutting simulation according to the present invention. In FIG. 1, the cutting simulation display device mainly includes a simulation core section 10 and a simulation display section 20. The simulation core section 10 represents the shape of a workpiece using a voxel model and simulates changes in the shape of the workpiece by a cutting operation. The simulation display section 20 displays on the screen the shapes of the workpiece that consecutively change.

The simulation core section 10 includes workpiece shape data 11, tool path data 12, and a cutting simulation section 13. The workpiece shape data 11 is stored in the storage of the device and represented in a voxel model. Similarly, the tool path data 12 is stored in the storage of the device and includes information of tool shapes and tool travel paths. The cutting simulation section 13 updates the workpiece shape data 11 on the basis of the tool path data 12.

On the other hand, the simulation display section 20 includes projection parameters 21, a rendered workpiece image buffer 22, a rendered workpiece depth buffer 23, a screen display frame buffer 24, updated rendering region management data 25, a rendered workpiece image update section 26, tool rendering region management data 27, a rendered tool image creation section 28, and an image transfer section 29. The projection parameters 21 include, for example, the direction of line of sight and illumination conditions for rendering the workpiece and the tool. The rendered workpiece image buffer 22 holds only an image of the workpiece rendered by projection in the direction of line of sight. The rendered workpiece depth buffer 23 holds the depth distance of each pixel from the projection plane to the workpiece surface when the single workpiece is rendered by projection in the direction of line of sight. The screen display frame buffer 24 holds a rendered image of the workpiece and the tool to display it on the screen such as a CRT. The updated rendering region management data 25 manages the region information required to be updated in the rendered workpiece image buffer 22 and the rendered workpiece depth buffer 23. The rendered workpiece image update section 26 recalculates the data of the rendered workpiece image buffer 22 and the rendered workpiece depth buffer 23 by ray tracing from the workpiece shape data (voxel) 11. The tool rendering region management data 27 manages a region in which the tool was rendered in the previous display update. The rendered tool image creation section 28 creates a projected rendering image of and near the tool by ray tracing on the basis of the tool shape in the tool path data 12 and at the end of the travel path, i.e., the current position of the tool. The image transfer section 29 transfers to the screen display frame buffer 24 the image data of an updated region in the rendered workpiece image buffer 22 and the rendered tool image created by the rendered tool image creation section 28.

Here, the rendered workpiece image buffer 22, the rendered workpiece depth buffer 23, and the screen display frame buffer 24 have the same number of pixels (width by height). Furthermore, the updated rendering region management data 25 represents an updated region with the coordinates of two vertices on the diagonal line and is initialized so as to be displayed on the entire screen at the beginning of a simulation.

At the beginning of a simulation, the workpiece shape data 11 represents the shape of an unprocessed workpiece. Only at the start of the simulation, the rendered workpiece image update section 26 calculates and initializes by ray tracing the data of both the rendered workpiece image buffer 22 and the rendered workpiece depth buffer 23 for the entire display region. The image transfer section 29 then transfers the data of the entire region of the rendered workpiece image buffer 22 to the screen display frame buffer 24. After the initial display is completed in this manner, the updated rendering region management data 25 is cleared to null.

Figure 3:
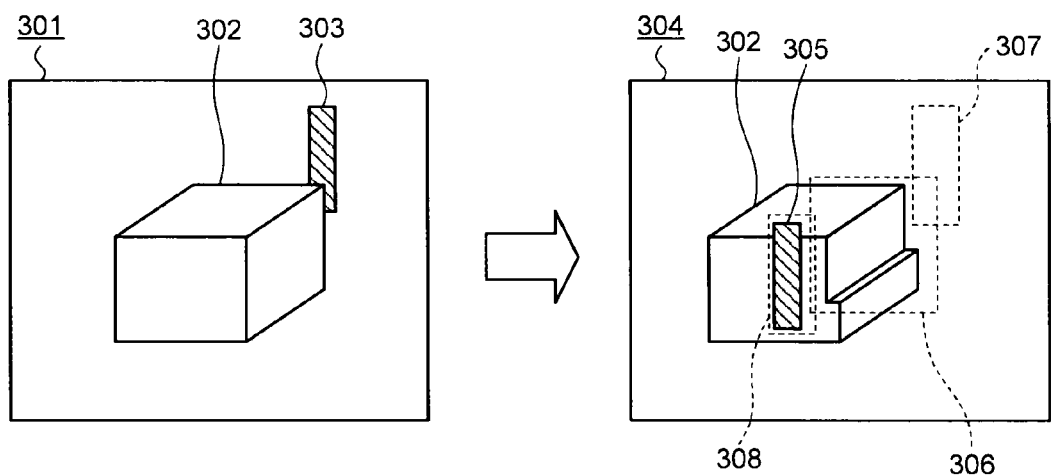
FIG. 3 is a view illustrating an example of a screen display update in an embodiment of a device for displaying a cutting simulation according to the present invention.

Now, operations during the simulation will be described. FIG. 3 illustrates a typical example of updated screen display during a simulation. This figure illustrates non-updated display contents or previous display contents denoted by 301 and the display contents resulting from the current display update denoted by 304. 306 shown by short dashed lines in the figure is a rendering region corresponding to a change in shape of a workpiece 302. 307 denotes a region in which a not-yet-displaced tool 303 was previously rendered, whereas 308 denotes a region in which a displaced tool 305 will be rendered. In updating screen display, related data has to be updated so that at least these regions 306 to 307 display the latest contents.

Now, the operation of each section will be described. The cutting simulation section 13 reads tool shape information and one step of path information from the tool path data 12 to simulate a cutting operation associated with a tool movement, and updates the workpiece shape data 11 based on the result. The cutting is simulated, for example, by performing a difference Boolean operation on the workpiece shape data 11 to subtract a swept tool shape, obtained by sweeping the tool shape along the path of movement, from the workpiece shape.

Each time one step of cutting simulation is completed, the cutting simulation section 13 sends, to the rendered workpiece image update section 26, the three-dimensional region data which has been changed by the cutting. Here, the three-dimensional region data is assumed to be a three-dimensional inclusion box surrounding the changed portion of the workpiece shape. The rendered workpiece image update section 26 calculates a two-dimensional updated region, which is obtained by projecting the received three-dimensional region data with the projection parameters 21, and updates the updated rendering region management data 25.

Now, the rendered workpiece image update section 26 calculates the pixel data (RGB values) and the depth distance by ray tracing for the pixels included in the updated region using the updated rendering region management data 25. The rendered workpiece image update section 26 then updates the rendered workpiece image buffer 22 and the rendered workpiece depth buffer 23.

Figures 1, 2:
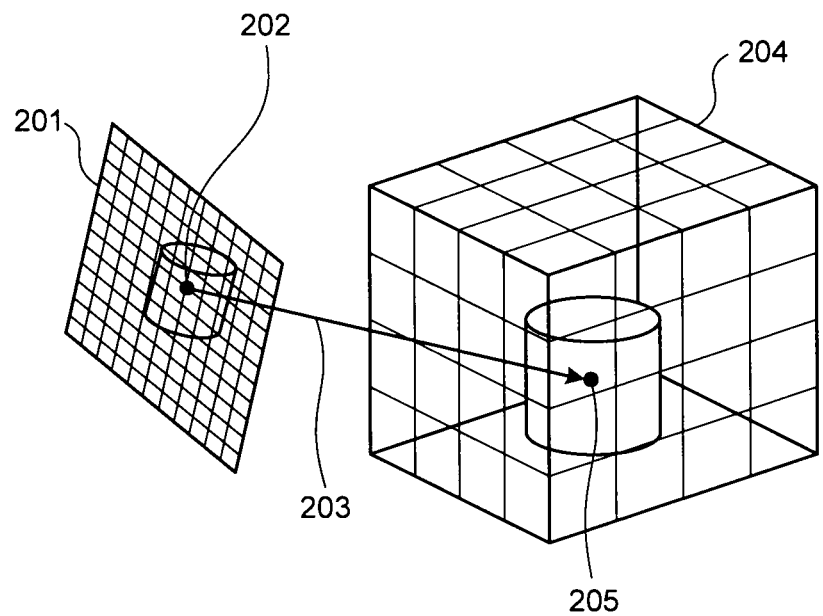
Figure 2:
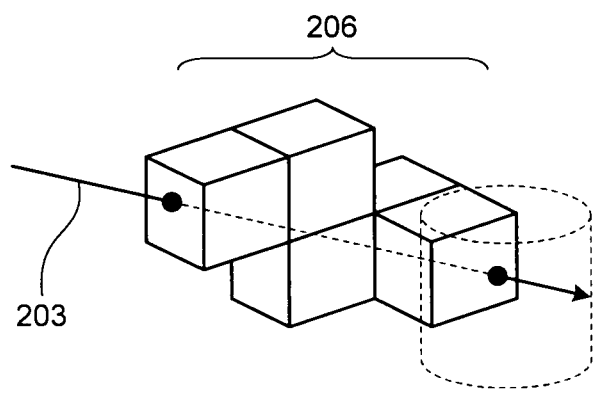
Figures 1, 4:
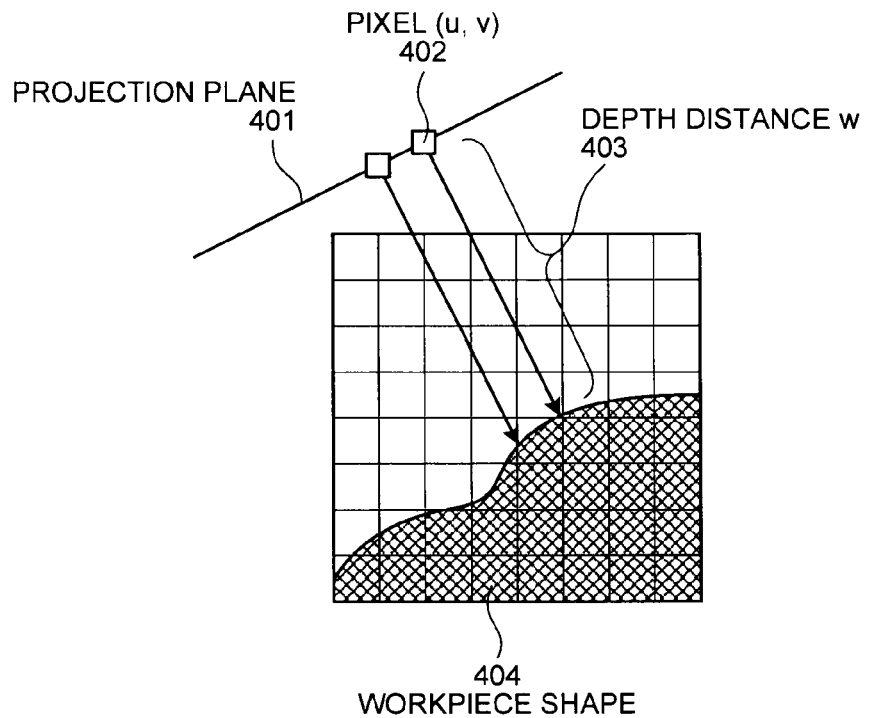
Figures 2, 4:
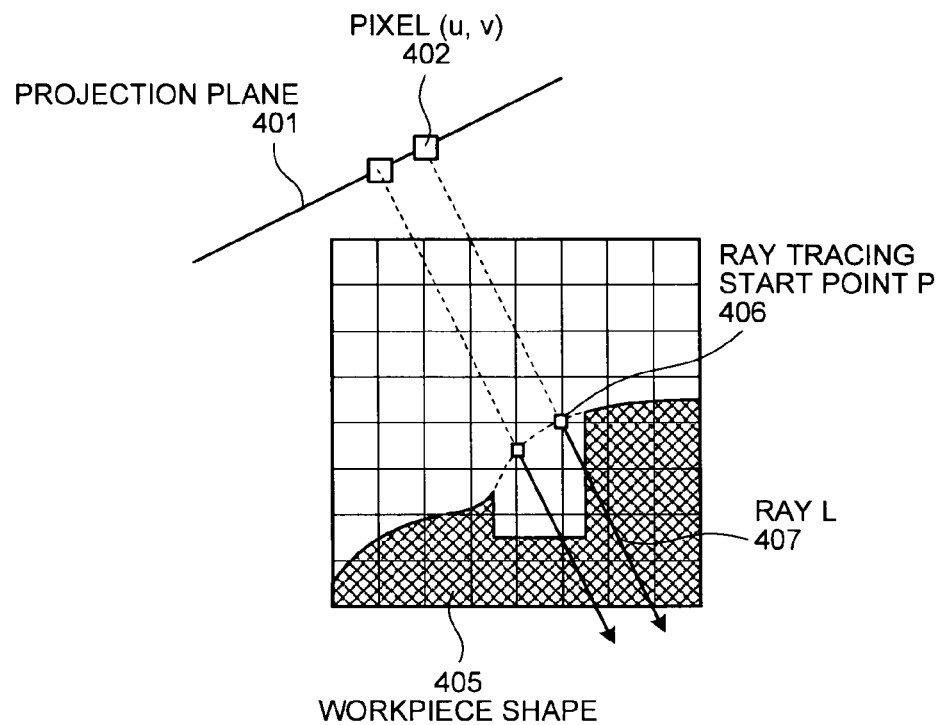

Here, the coordinates of the current pixel to be processed are assumed to be (u, v). FIGS. 4-1 and 4-2 each are an explanatory cross-sectional view illustrating the basic principle of ray tracing in the rendered workpiece image update section 26 when the projection plane is viewed horizontally from the side. FIG. 4-1 illustrates the result of the ray tracing in the previous screen display update. In the figure, the depth distance (depth distance w) 403 from the target pixel (pixel (u, v)) 402 on the projection plane 401 to the surface of the workpiece shape 404 is calculated and stored in the rendered workpiece depth buffer 23.

FIG. 4-2 illustrates the ray tracing in the current screen display update. In the figure, the current ray tracing starts at a point (ray tracing start point P) 406 spaced apart from the target pixel 402 by the depth distance 403. The ray tracing start point 406 is located on the surface of the workpiece shape at the time of the previous screen display update. However, when the cutting has changed the workpiece shape 404 in FIG. 4-1 into the workpiece shape 405 in FIG. 4-2, the new surface of the shape always appears at a deeper position in the direction of line of sight (see a ray (ray L) 407 in FIG. 4-2). Therefore, the ray tracing started at the point 406 still provides a proper result of rendering.

[Ray Tracing by the Rendered Workpiece Image Update Section (Ray Tracing of Workpiece)]

Figure 5:
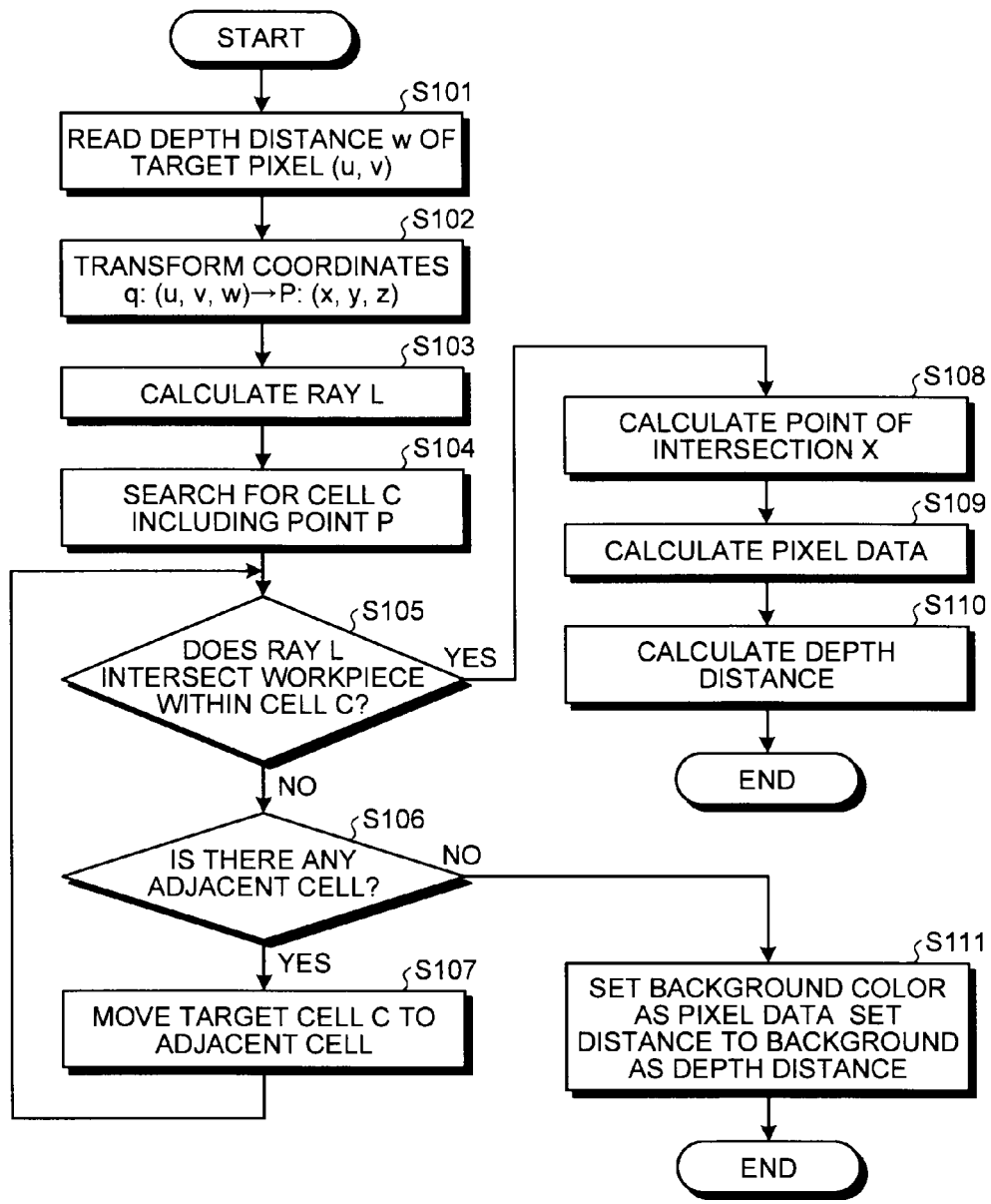
FIG. 5 is a flowchart illustrating the flow of ray tracing in the rendered workpiece image update section.

FIG. 5 is a flowchart illustrating the operation of the ray tracing in the rendered workpiece image update section 26. Note that symbols in the flowchart are used in a basic model for ray tracing (see FIGS. 4-1 and 4-2). Referring to FIG. 5, in step S101, the rendered workpiece image update section 26 first reads the rendered workpiece depth buffer 23 for the depth distance w to the pixel of interest. Next, in step S102, a three-dimensional coordinate point q(u, v, w) obtained by combining the pixel coordinates (u, v) and the depth distance w is converted into the coordinate system of the workpiece shape data to find the three-dimensional coordinates P(x, y, z). Subsequently, in step S103, a line segment L perpendicular to the projection plane and starting at a point P in the direction of depth is calculated as ray data. In step S104, the voxel model as workpiece shape data is searched for cell C which includes the point P.

Ray tracing takes place in the loop from steps S105 to S107. In step S105, it is determined whether the ray L intersects the surface of the workpiece shape within the cell C of interest. If "Yes," the process exits the loop and proceeds to step S108. If "No," it is determined in step S106 whether there is a cell adjacent to the cell C of interest via an interface, on which the cell C intersects the ray L in a deeper position among 6 interfaces of the cell C. If there is an adjacent cell, the adjacent cell is employed as a new cell C of interest in step S107, and the process returns to step S105. If there is no adjacent cell, the process moves to step S111.

Steps S108 to S110 are applied to a case where the ray L intersects the surface of the workpiece shape within the cell C of interest. In step S108, the point of intersection X is calculated. Next, in step S109, the pixel data (the luminance of each of RGB) is calculated based on the normal vector to the workpiece shape and the illumination condition at the point of intersection X from the projection parameters 21, and then stored at the associated position in the rendered workpiece image buffer 22. In step S110, the distance from the projection plane to the point of intersection X (the depth distance) is calculated and stored at the associated position in the rendered workpiece depth buffer 23. Then, the process exits the ray tracing.

Step S111 is applied to the case where the ray L passes through the voxel model without intersecting the workpiece shape. In this case, a predetermined background color is stored at the associated position in the rendered workpiece image buffer 22, and a background distance of a sufficiently large value is stored at the associated position in the rendered workpiece depth buffer 23.

Note that the present embodiment is configured such that the rendered workpiece image buffer 22 and the rendered workpiece depth buffer 23 hold the rendered image data and the depth distance data of the workpiece shape to be cut. However, it is also acceptable to store data created by combining the projected rendered image and the depth distance data calculated relative to another object, such as a workpiece fixture, which is located at an invariant position relative to the workpiece during a cutting simulation.

The rendered tool image creation section 28 creates a projected rendered image of and near the tool. This is done when the data associated with all the pixels to be updated in the rendered workpiece image buffer 22 and the rendered workpiece depth buffer 23 has been updated by ray tracing as described above. The current processing also creates images by ray tracing.

The target region in which a rendered tool image is produced is a two-dimensional region on which the three-dimensional inclusion box surrounding the tool shape at the current position is projected with the projection parameters 21 on the basis of the tool shape information and the current tool position (the end of a travel path) stored in the tool path data 12. For the pixels included in this two-dimensional region, an image is created by ray tracing.

[Ray Tracing by the Rendered Tool Image Creation Section (Ray Tracing for Tool)]

FIG. 6 is a flowchart illustrating the operation of ray tracing in the rendered tool image creation section 28. Note that symbols in the flowchart are used in a basic model of ray tracing (see FIGS. 4-1 and 4-2). Referring to FIG. 6, in step S201, the rendered tool image creation section 28 first calculates, as ray data, a line segment L perpendicular to the projection plane and starting from the pixel to be processed in the direction of depth. Next, in step S202, it is determined whether the ray L intersects the surface of the tool shape. If "Yes," the process proceeds to step S203. In step S203, the point of intersection X of the ray L and the surface of the tool shape is calculated. Next, in step S204, the depth distance d from the projection plane to the point of intersection X is calculated. Then, in step S205, the depth distance w associated with the pixel of interest is read from the rendered workpiece depth buffer 23. In step S206, the depth distances d and w are compared.

Step S207 is applied to the case where d<w in step S206, i.e., the tool shape is positioned before the workpiece shape. In this case, the pixel data (the luminance of each of RGB) is calculated based on the normal vector to the tool shape and the illumination condition at the point of intersection X from the projection parameters 21. Then, the pixel data is stored as pixel data of a rendered tool image. Step S208 is applied to the case where the ray L doesn't intersect the surface of the tool shape in step S202 or where d ≥w in step S206, i.e., the tool shape is located in a deeper position than the workpiece shape. In this case, the pixel data associated with the pixel of interest is read from the rendered workpiece image buffer 22 and employed as the pixel data of the rendered tool image.

Finally, the image transfer section 29 transfers, to the screen display frame buffer 24, partial image data in the rendered workpiece image buffer 22 and the rendered tool image data created in the rendered tool image creation section 28.

Here, the partial image data of the regions corresponding to the updated region stored in the updated rendering region management data 25 and the previous tool rendering region stored in the tool rendering region management data 27 is read from the rendered workpiece image buffer 22, and then transferred to the screen display frame buffer 24. Subsequently, the rendered tool image data created by the rendered tool image creation section 28 is transferred to the screen display frame buffer 24. When the image transfer to the screen display frame buffer 24 is completed, the image transfer section 29 clears the updated rendering region management data 25 and sets the region of the current rendered tool image to the tool rendering region management data 27.

As described above, according to the present embodiment, the image to be displayed on the screen is created in two processing steps: workpiece ray tracing and tool ray tracing. This allows for performing the ray tracing only on the region truly required to be updated, thereby reducing the amount of computation. Furthermore, as described above, the ray tracing of the workpiece and the tool can be performed separately in this manner, thereby making each ray tracing adequate and efficient. Furthermore, the workpiece ray tracing uses the previously determined depth distance to eliminate the need of an unnecessary determination of an intersection of the ray and the cell, thereby reducing the amount of computation.

In the present embodiment, the device for displaying a cutting simulation is configured to include the rendered workpiece image update section 26 for ray tracing of the workpiece and the rendered tool image creation section 28 for ray tracing of the tool. However, it is also acceptable to update only rendered images of a change in the workpiece shape without the rendered tool image creation section 28. This arrangement eliminates the need of creating a rendered tool image and transferring an image of a tool rendering region, thus further reducing the amount of computation.

As such, a cutting simulation system according to the present embodiment allows a cutting simulation by representing the shape of a workpiece in the voxel model and simulating changes in the workpiece shape made by cutting operations. This cutting simulation can be performed even with a small amount of computation, thus implementing the cutting simulation even on an inexpensive low-performance computer.

Industrial Applicability

As described above, the present invention can be effectively applied to a simulation which employs a voxel model to represent the shape of an object and simulate it on a computer. In particular, the invention is suitable to a cutting simulation in which a computer simulates changes in the workpiece shape or a complicated cut surface that is created during a cutting operation and defined by the relative motion between the tool and the workpiece.

Explanations Of Letters Or Numerals
   10 Simulation core section
   11 Workpiece shape data represented in voxel model
   12 Tool path data including information of tool shapes and tool travel paths
   13 Cutting simulation section
   20 Simulation display section
   21 Projection parameters
   22 Rendered workpiece image buffer
   23 Rendered workpiece depth buffer
   24 Screen display frame buffer
   25 Updated rendering region management data
   26 Rendered workpiece image update section
   27 Tool rendering region management data
   28 Rendered tool image creation section
   29 Image transfer section
   201 Projection plane
   202 Target pixel for ray tracing
   203 Ray
   204 Voxel model
   205 Intersection of ray and object
   206 Cell found on a way of ray
   301 Previous rendering
   302 Workpiece 303 Not-yet-displaced tool
304 Current rendering
305 Displaced tool
306 Region in which the workpiece shape was changed
307 Region in which the tool was previously rendered
308 Region in which the tool will be rendered
401 Projection plane
402 Pixel
403 Depth distance
404, 405 Workpiece shape
406 Ray-tracing start point
407 Ray

The invention claimed is:

1. A device for displaying a cutting simulation for representing a shape of a workpiece in a voxel model to simulate a change in the shape of the workpiece by a cutting operation, the device comprising:

a rendered workpiece image update section for managing a rendered workpiece image buffer and a rendered workpiece depth buffer to hold image data and depth distance data of a projected image of the workpiece and updating by ray tracing a portion in the rendered workpiece image buffer and the rendered workpiece depth buffer, the portion being associated with a rendering region corresponding to a change in the shape of the workpiece, wherein the rendered workpiece image update section starts ray tracing at a location defined by a non-updated previous depth distance and coordinates of a ray-traced pixel by selecting a cell that includes the starting location point, such that ray tracing is started from a surface of the workpiece image which has been cut away and proceeds deeper in a direction of a line of sight by reselecting a cell adjacent to the cell being processed via an interface among 6 interfaces of the cell on which the cell intersects the ray in a deeper position.

2. A device for displaying a cutting simulation for representing a shape of a workpiece in a voxel model to simulate a change in the shape of the workpiece by a cutting operation, the device comprising:

a rendered workpiece image update section for managing a rendered workpiece image buffer and a rendered workpiece depth buffer to hold image data and depth distance data of a projected image of the workpiece and updating by ray tracing a portion in the rendered workpiece image buffer and the rendered workpiece depth buffer, the portion being associated with a rendering region corresponding to a change in the shape of the workpiece;

a rendered tool image creation section for creating a rendered tool image by ray tracing for a current tool rendering region with reference to the rendered workpiece image buffer and the rendered workpiece depth buffer updated by the rendered workpiece image update section; and an image transfer section for transferring a partial image of the previous tool rendering region and the current workpiece rendering region to be updated from the rendered workpiece image buffer to a display frame buffer as well as transferring a current rendered tool image to the display frame buffer, wherein the ray tracing for the rendered workpiece uses a previously determined depth distance, wherein the rendered workpiece image update section starts ray tracing at a location defined by a non-updated previous depth distance and coordinates of a ray-traced pixel by selecting a cell that includes the starting location point, such that ray tracing is started from a surface of the workpiece image which has been cut away and proceeds deeper in a direction of a line of sight by reselecting a cell adjacent to the cell being processed via an interface among 6 interfaces of the cell on which the cell intersects the ray in a deeper position.

3. The device for displaying a cutting simulation according to claim 2, wherein the rendered workpiece image update section refreshes a region in which the tool was previously rendered and updates a region corresponding to a change in the shape of the workpiece, and the rendered tool image creation section updates the current tool rendering region.

4. A method for displaying a cutting simulation for representing a shape of a workpiece in a voxel model to simulate a change in the shape of the workpiece by a cutting operation, the method comprising:

a rendered workpiece image update step of managing a rendered workpiece image buffer and a rendered workpiece depth buffer to hold image data and depth distance data of a projected image of the workpiece and updating by ray tracing a portion in the rendered workpiece image buffer and the rendered workpiece depth buffer, the portion being associated with a rendering region corresponding to a change in the shape of the workpiece;

a rendered tool image creation step of creating a rendered tool image by ray tracing for a current tool rendering region with reference to the rendered workpiece image buffer and the rendered workpiece depth buffer updated in the rendered workpiece image update step; and an image transfer step of transferring a partial image of the previous tool rendering region and the current workpiece rendering region to be updated from the rendered workpiece image buffer to a display frame buffer as well as transferring a current rendered tool image to the display frame buffer, wherein the ray tracing for the rendered workpiece image updating step uses a previously determined depth distance, wherein the ray tracing for the rendered workpiece image starts ray tracing at a location defined by a non-updated previous depth distance and coordinates of a ray-traced pixel by selecting a cell that includes the starting location point, such that ray tracing is started from a surface of the workpiece image which has been cut away and proceeds deeper in a direction of a line of sight by reselecting a cell adjacent to the cell being processed via an interface among 6 interfaces of the cell on which the cell intersects the ray in a deeper position.

5. The method for displaying a cutting simulation according to claim 4, wherein the rendered workpiece image update step includes starting ray tracing at a location defined by a non-updated previous depth distance and coordinates of a ray-traced pixel.

6. The method for displaying a cutting simulation according to claim 4, wherein the rendered workpiece image update step includes refreshing a region in which the tool was previously rendered and updates a region corresponding to a change in the shape of the workpiece, and the rendered tool image creation step includes updating a current tool rendering region.

* * * * *